(12) United States Patent
McElroy

(10) Patent No.: US 11,330,230 B2
(45) Date of Patent: *May 10, 2022

(54) INTERNET COMMUNICATION SYSTEM THAT MODIFIES USERS' PERCEPTIONS BASED ON THEIR PROXIMITY WITHIN A VIRTUAL SPACE

(71) Applicant: Leo McElroy, Westport, CT (US)

(72) Inventor: Leo McElroy, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/199,037

(22) Filed: Mar. 11, 2021

(65) Prior Publication Data

US 2021/0368135 A1 Nov. 25, 2021

Related U.S. Application Data

(63) Continuation of application No. 17/030,631, filed on Sep. 24, 2020, now Pat. No. 10,979,671.

(60) Provisional application No. 63/027,952, filed on May 20, 2020.

(51) Int. Cl.
*H04N 7/15* (2006.01)
*H04N 7/14* (2006.01)

(52) U.S. Cl.
CPC ............. *H04N 7/157* (2013.01); *H04N 7/147* (2013.01); *H04N 7/152* (2013.01)

(58) Field of Classification Search
CPC ............ H04N 7/14; H04N 7/15; H04N 7/147; H04N 7/152; H04N 7/157
USPC .......................................... 348/14.01–14.16
See application file for complete search history.

(56) References Cited

U.S. PATENT DOCUMENTS

| | | | |
|---|---|---|---|
| 9,791,897 B2 | 10/2017 | Bear et al. | |
| 9,800,931 B1 | 10/2017 | Tangeland | |
| 2014/0118403 A1* | 5/2014 | Verthein | H04N 21/41415 345/660 |
| 2015/0058871 A1* | 2/2015 | Haff | H04N 21/4858 725/9 |
| 2017/0279860 A1 | 9/2017 | Agarwal et al. | |
| 2019/0373216 A1* | 12/2019 | Cutler | H04N 5/607 |

* cited by examiner

*Primary Examiner* — Melur Ramakrishnaiah
(74) *Attorney, Agent, or Firm* — Whitmyer IP Group LLC

(57) ABSTRACT

A system is provided having a computer, a user device, an audiovisual data source, a virtual distance assigned to the audiovisual data source received by the user device, video data from the audiovisual data source received by the user device, the user device displaying the video data at a first size, wherein when the virtual distance is changed, the size at which the video data is displayed changes.

20 Claims, 6 Drawing Sheets

INTERNET COMMUNICATION SYSTEM THAT MODIFIES USERS' PERCEPTIONS BASED ON THEIR PROXIMITY WITHIN A VIRTUAL SPACE

CROSS-REFERENCE TO RELATED APPLICATIONS

This application is a continuation of U.S. patent application Ser. No. 17/030,631, filed Sep. 24, 2020, which disclosure claims the benefit, under 35 U.S.C. § 119(e), of U.S. Provisional Patent Application No. 63/027,952, filed May 20, 2020, the contents of which are incorporated herein by reference in their entirety.

TECHNICAL FIELD

The present invention relates to a novel internet-based communication system which modifies user perception based on their proximity within a virtual space. Specifically, the system is used for communication between two or more people and modifies the way messages and media streams are sent and/or received based on where those users are represented within the application's virtual space either relatively or absolutely.

BACKGROUND

Audio and/or video communication has been a growing area of technology for many years. Many businesses have migrated their client facing operations to audio and/or video platforms, and recreational audio and/or video communication platforms have been developing in-step.

Audio and/or video communication platforms have been designed for each user in a call/session/chat to send and receive the same messages at the same time, e.g. each participant on a call hears the person speaking with the same volume.

This paradigm of anyone who is virtually present receiving the same sensory experience via the application presents an issue. Only one participant can contribute at one time, and all participants are socially restricted to generalizing their communication to be applicable to all participants each time they contribute.

In other words, the Brady Bunch-style video conference has inherent problems that prevent effective communication between participants.

Therefore a need exists for a more flexible communication system where participants can easily contribute simultaneously and/or selectively communicate to other participants. A further need exists for intuitive and effective methodologies for how to manage simultaneous and/or selective communications.

By re-architecting group audio and/or video communication as simultaneous few-to-few conversations with at-will transitions between said conversations users can participate in social group communication in a manner more similar to physical social interaction. Our innovation views social group communication as being constituted by the ability to fluidly move between few-to-few interactions, rather than being placed in a static many-to-many or one-to-many environment.

SUMMARY

The present invention comprises a novel method for addressing common pitfalls of current audio and/or video communication applications. Specifically the current standard for group audio and/or video communication forces all participants into the same conversation or does not enable them to navigate between conversations without leaving and re-entering the virtual environment. The method and embodiments of our invention use a virtual space and users' positions in said virtual space to modify and/or selectively filter media streams and the way they are conveyed to users in order to establish a spatial and dynamic user experience. The invention captures salient features of real-world communication by injecting spatial limitations on the way user's experience each other's media streams. It relies on the realization that group social interactions are often constituted by many parallel small conversations that can fluidly merge and branch rather than a single large conversation between all participants.

The present invention uses inspiration from real-world person-to-person communication to address needs for simultaneous and selective communication. The application places people in a virtual space, and modifies the communications between participants based on where they are in that virtual space. The generation of a specific user's interface from all participants' locations is performed through a prominence mapping function. The application tracks where users are in the virtual space and allows them to move throughout it. In preferred embodiments, the application modifies communication intuitively as though the virtual space was a physical one. This technology enables video conference participants to conduct parallel conversations that can merge and split at participants' wills. It can also be used for group work in educational settings or for providing a more immersive multiplayer gaming experience. Our virtual space is implemented in one-dimension but there is a large variety of possible spaces that could contain user locations. There is also a variety of prominence mapping functions. The preferred embodiment modulates audio though linear fade with a cutoff value, and modulates video through a radius assignment and circle packing algorithm.

The invention functions by creating a virtual room with stored spatial dimensions. As users enter the room they are assigned a location in that virtual space and establish real time communication channels with prior participants. Upon the verification of these channels participants share their location data with each other. This synchronization allows media streams to be appropriately rendered. Participants can modify their perception of the room by changing their location in the virtual space. These user interactions are propagated to all other participants in order to retain coherent room perceptions. Upon changes to relative distances between participants the rooms' location data is piped into a sensory prominence mapping function. This mapping function modulates the prominence of audio and visual streams in the user's view in order to render closer participants more prominent and farther participants less so.

In one aspect of the present invention, a system for controlling the communication of audiovisual conference data is provided having a computer, a user device in data communication with said computer, at least one presenter device in data communication with said computer having an audio source for transmitting audio data and a video source for transmitting video data, the user device having speakers for playing the transmitted audio data at a first volume and a screen for displaying transmitted video data, the transmitted video data from different presenter devices being displayed in different areas of said screen, each area having a first size, at least one virtual distance assigned between the user device and each of the at least one presenter devices, the screen displaying a user device icon and at least one presenter device icon corresponding to each of the presenter devices with an indication of the virtual distance between the user device and at least one of the presenter devices, the user device having an input device for inputting a user command to modify the virtual distance between the user device at least one of the at least one presenter devices, the modification of the virtual distance being transmitted to the at least one presenter device, the screen displaying an updated indication of the virtual distance between the user device and at least one of the presenter devices, the speakers playing the transmitted audio data from at least one of the presenter devices at a second volume based on the change in the virtual distance between the user device and at least one of the presenter devices, and the screen displaying the transmitted video data from at least one of the presenter devices in an area of a second size based on the change in the virtual distance between the user device and at least one of the presenter devices.

In another aspect of the present invention, a system for controlling the communication of audiovisual conference data is provided having a computer, a user device in data communication with said computer having speakers for playing the transmitted audio data and a screen for displaying transmitted video data, at least one presenter device in data communication with said computer having an audio source for transmitting audio data and a video source for transmitting video data, a database of files representing conferences, the database being in data communication with said computer, each file representing a conference including transmitted audio data and transmitted video data from at least one presenter device, at least one virtual distance assigned between the user device and each of the at least one presenter devices, the user device having an input for modifying the at least one virtual distance, the computer routing the audio data and the video data from each of the at least one presenter devices to the user device based on the virtual distance.

BRIEF DESCRIPTION OF THE DRAWINGS

The preferred embodiment of the invention is illustrated in an example drawing and illustrations of an application user interface. It is not limited by the accompanying figures. The illustrations are exemplary and are not exhaustive as a demonstration of the invention's features or capabilities.

FIG. 2 depicts one user's view of the two other participants with one participant nearby and another more distant.

DETAILED DESCRIPTION

The present invention will now be described by referencing the appended figures representing the preferred embodiment.

Figure 1:
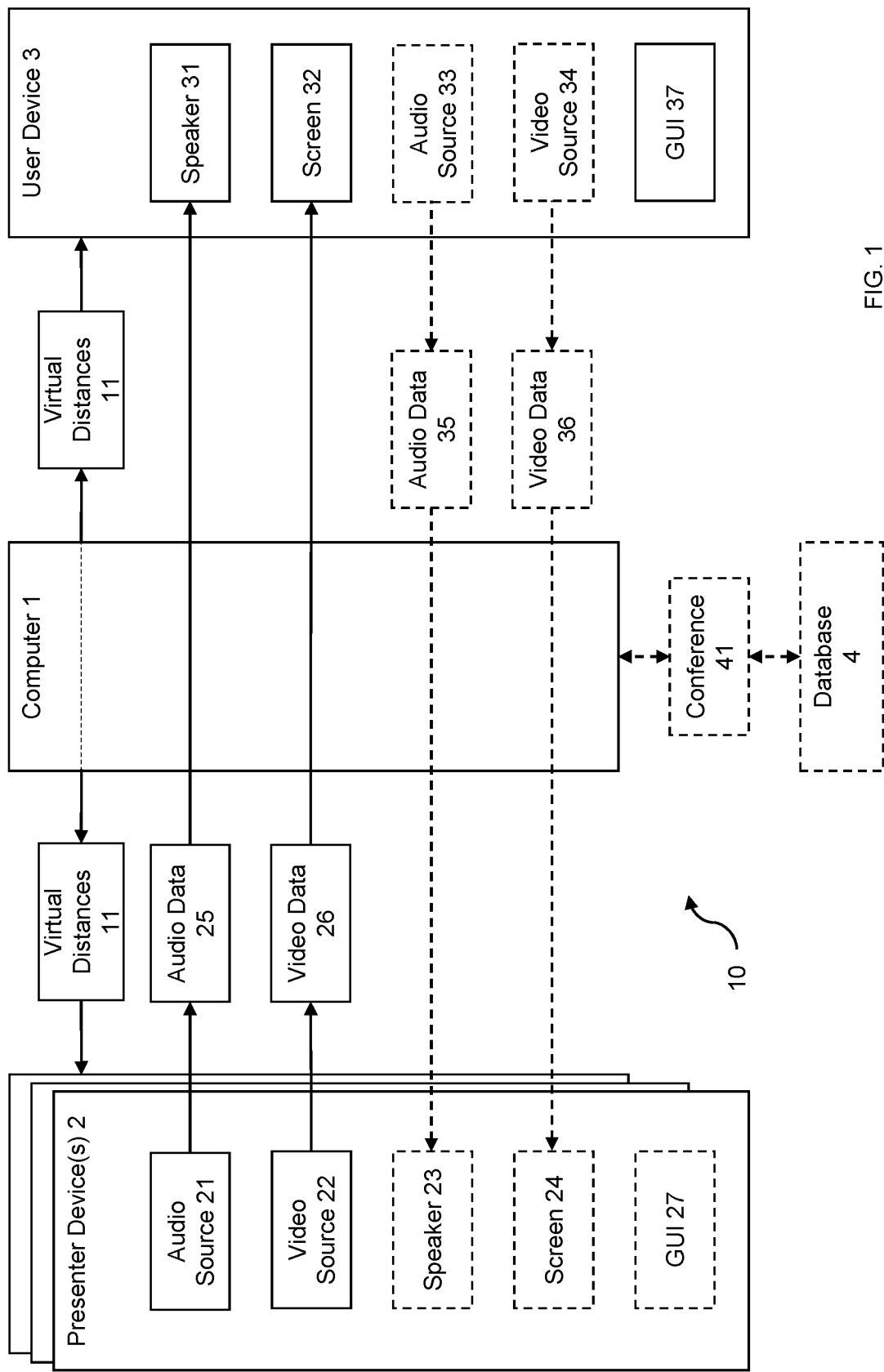
FIG. 1 shows a schematic diagram of the presently disclosed system.

Referring to FIG. 1, the present disclosure describes a system 10 for providing geolocation-based content.

The system 10 includes a computer 1. The computer 1 may be a processor, remote computer, computer server, network, or any other computing resource, including mobile devices.

The computer 1 may be in data communication with a presenter device 2. The presenter device 2 may be a computer, laptop, smartphone, tablet, or other electronic device, including mobile devices, capable of transmitting data to the computer 1. Presenter device 2 may run an application on a mobile device or smartphone. The presenter device 2 may have an input device such as a mouse and keyboard, touchscreen, trackpad, etc. The presenter device 2 may include an audio source 21 and a video source 22. The audio source 21 may be a microphone and the video source 22 may be a webcam, camera, etc. The audio source 21 and/or the video source 22 may be embodied in the presenter device 2, such as an integrated camera and microphone on a laptop computer or smartphone.

Commonly, the presenter device 2 may have a speaker 23 and a screen 24. The speaker 23 may be a general speaker, headphones, earbuds, desktop speakers, or the like. The screen 24 may be a general screen, monitor, television, smartphone screen, or the like. The speaker 23 and the screen 24 may be embodied in the presenter device 2, such as in an integrated speaker and screen on a laptop computer or smartphone. The screen 24 may be configured to show a graphical user interface 25.

The computer 1 may be in data communication with a user device 3. The user device 3 may be a computer, laptop, smartphone, tablet, or other electronic device, including mobile devices, capable of transmitting data to the computer 1. The user device 3 may run an application on a mobile device or smartphone. The user device 3 may have an input device such as a mouse and keyboard, touchscreen, trackpad, etc. The user device 3 may have a speaker 31 and a screen 32. The speaker 31 may be a general speaker, headphones, earbuds, desktop speakers, or the like. The screen 32 may be a general screen, monitor, television, smartphone screen, or the like. The speaker 31 and the screen 32 may be embodied in the presenter device 2, such as in an integrated speaker and screen on a laptop computer or smartphone. The screen 32 may be configured to show a graphical user interface.

Commonly, the user device 3 may also include an audio source 33 and a video source 34. The audio source 33 may be a microphone and the video source 34 may be a webcam, camera, etc. The audio source 33 and/or the video source 34 may be embodied in the user device 3, such as an integrated camera and microphone on a laptop computer or smartphone.

The presenter device 2 and/or the user device 3 may begin a video conference. The presenter device 2 and the user device 3 may establish a connection between one another such that at least the presenter device 2 may send audio data 25 and video data 26 to the user device 3. The audio data 25 and video data 26 may come from audio source 21 and video source 22, respectively. User device 3 may process and/or play the audio data 25 and the video data 26 received. The presenter device 2 and/or the user device 3 may each have multiple audio sources 21, 33, video sources 22, 34, speakers 23, 31 and/or screens 24, 32. Each of these may be selectable for use during the video conference. The user device 2 and the presenter device 3 may selectively choose to enable their video and audio streams during a conference.

The connection between the presenter device 2 and the user device 3 may be either direct or indirect. The computer 1 may include a server that assists with directly connecting the presenter device 2 and the user device 3. Such a direct connection may be a peer-to-peer connection. The computer 1 may also include a server in case a direct connection between the presenter device 2 and the user device 3 cannot directly connect. Alternatively, the computer 1 may be required to make a connection between the presenter device 2 and the user device 3.

Before or during transmission of the audio data 25 and the video data 26, the presenter device 2 may adjust the resolution, bit rate, etc. associated with the audio data 25 and/or video data 26. For example, if the user device 3 has a bad internet connection, presenter device 2 may reduce its transmission bandwidth to compensate. If the audio data 25 and/or the video data 26 are being sent via the computer 1, the computer 1 may adjust the resolution, bit rate, etc. either in addition to or independently of the presenter device 2.

Once the video conference is established, virtual distances 11 may be established for the presenter device 2 and the user device 3. The virtual distances 11 may be established by the computer 1, or may be agreed by between each presenter device 2 and user device 3.

The virtual distance 11 may be represented by a distance by a line, on a plane, or any N-dimensional space. For example, the presenter device 2 and the user device 3 may be assigned "locations" along a line, and a distance between the two locations may be calculated. This is especially advantageous when multiple presenter devices 2 and user devices 3 are used. The virtual distances 11 may be discrete or continuous. In some applications, virtual distances 11 may be non-Euclidean.

The virtual distances 11 are used by the system 10 to determine the size of the video displayed on a screen 32 and the volume of the audio played through the speakers 31 for a particular presentation device 2.

Each user device 3 may display a graphical user interface 37 on the screen 32. The graphical user interface 37 may present a way for the user to input a change to the virtual distance 11. For example, the graphical user interface 37 may display a draggable icon, a text input field, or a clickable button, among other known methods. Based on the change to the virtual distance 11, the video displayed on a screen 32 from a particular presenter device 2 may increase or decrease in size. In addition, based on the change to the virtual distance 11, the audio played on the speakers 31 from a particular presenter device 2 may increase or decrease in volume. For example, if the virtual distance 11 between the user device 3 and the presentation device 2 increases, the video will become smaller and the volume will decrease. (See FIG. 2 to FIG. 3). At a certain threshold, the video may disappear and the volume may be muted. In this case, the presenter device 2 (or the computer 1) may cease transmitting video data 25 and audio data 26 to the user device 3. In contrast, if the virtual distance 11 between the presenter device 2 and the user device 3 decreases, the video from the presenter device may become larger and the volume may increase (e.g., FIG. 3 to FIG. 2).

Presenter devices 2 may also display a graphical user interface 27 on the screen 24 for adjusting the virtual distance 11.

In cases where sensory prominence is important, any change to the virtual distance 11 by the user device 3 may also be reflected in the size of any video displayed on screen 24 and any audio played through speaker 23 based on video data 36 and audio data 35, respectively. This allows both the presenter of the presenter device 2 and the user of user device 3 to have symmetrical experiences like in the real world. That is, increasing the virtual distance 11 is like walking away from someone in that they become "smaller" and "quieter." In this way, no one user is in total control of how the video conference is experienced by every other user.

In other situations, such as with a teacher teaching a class, symmetry may be less important, and the system 10 may weigh the virtual distances 11 to be in favor of keeping the teacher visible and audible by each and every student. As an example, the teacher may be at the "front" of the class, visible and audible by every student, and the teacher's device would display each and every student relatively equally. In situations such as this, when a student has a question, they could virtually move to the "front" of the class, so the rest of the class could hear and see the student asking the question. This could also be useful in presentation settings, during question and answer settings.

The computer 1 may also be in communication with a database 4. The database 4 may store information regarding the system 10, including conference information 44. The database 4 may be a storage drive or array accessible to computer 1, or cloud storage. Conference information 44 could include information regarding the user device 3, presenter device(s) 2, details regarding the conference, etc., or any other information required by the system 10.

Figure 4:
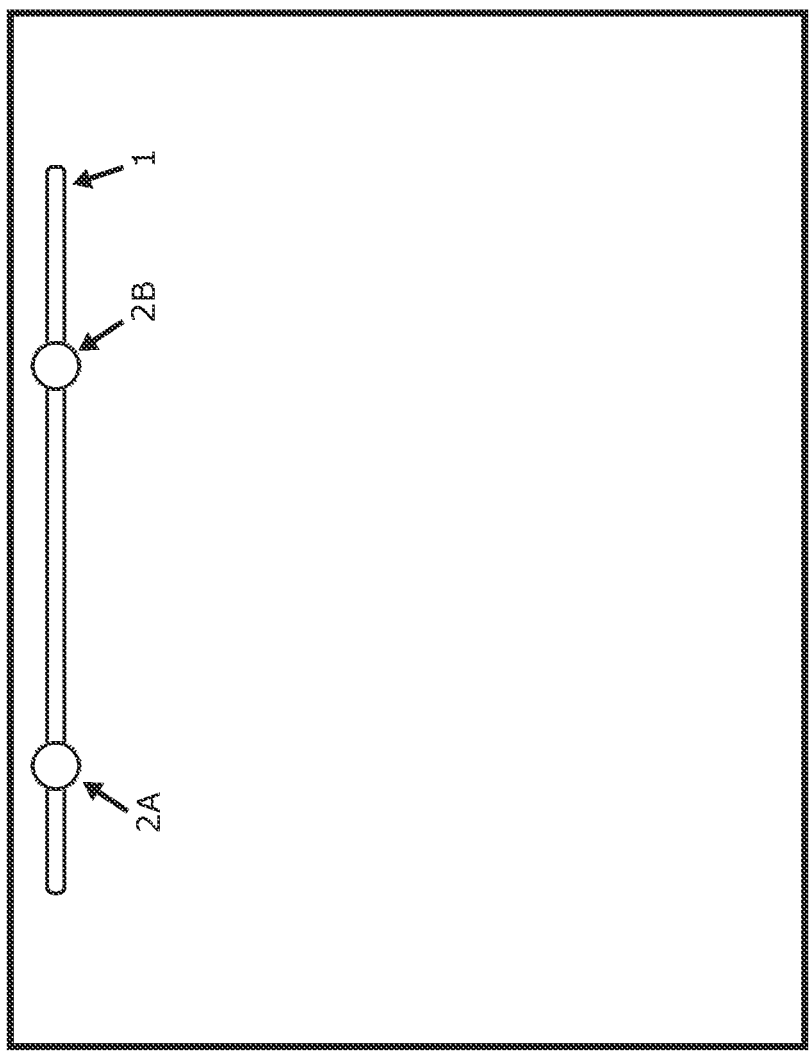
FIG. 4 depicts an example of a participant's view of the interface of the application in a one-dimensional virtual space with two participants who are distant. The element labeled 1 represents the virtual room, the elements labeled 2A and 2B represent participants.
Figure 5:
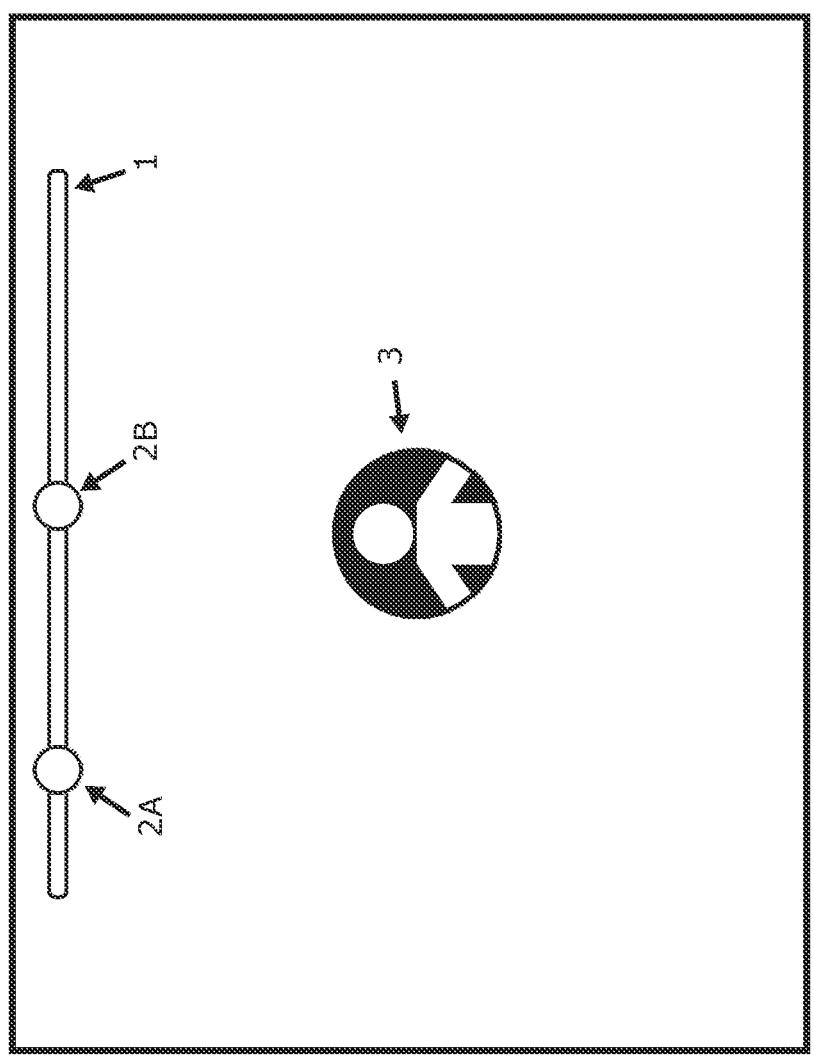
FIG. 5 depicts an example of a participant's view of the interface of the application in a one-dimensional virtual space with two participants who are moderately near.

FIG. 4 depicts an example of a graphical user interface 25, 37 with two participants (each using a user device 3 or a presenter device 2) in a one-dimensional virtual space where the participants are far by the measure of Cartesian distance. The virtual space is indicated by a horizontal line 1 at the top of FIG. 4. The participant using the interface is indicated in FIG. 5 by a circle 2B on the horizontal line 1. The second participant is indicated by a circle 2A on the horizontal line 1. The circles may be of different colors to indicate different participants. As a consequence of the circle 2B and the circle 2A being in distant proximity on the horizontal line 1, the second participant's video media stream is not being streamed to the first participant's device and said media stream is not visible. Notably, line 1 and circles 2A and 2B are illustrative, and can be replaced by icons of any appropriate shape and size.

Figure 6:
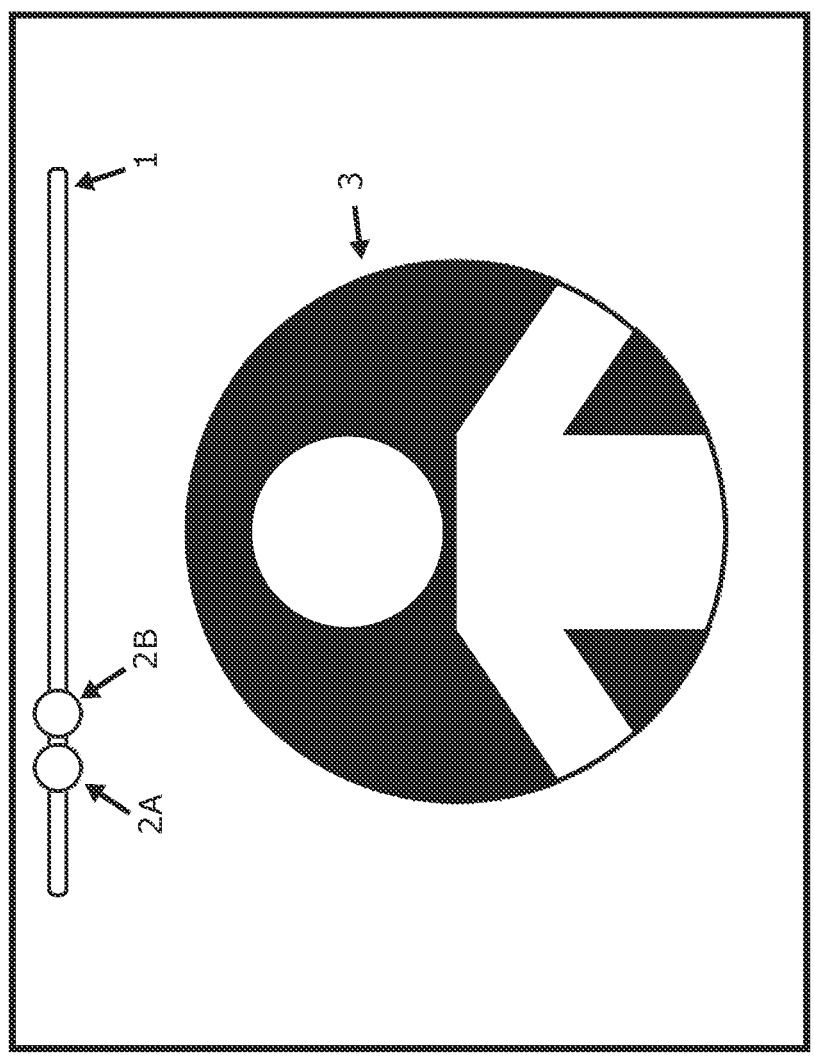
FIG. 6 depicts an example of a participant's view of the interface of the application in a one-dimensional virtual space with two participants who are very near.

As shown in FIG. 4, FIG. 5, and FIG. 6, each user (using either a presenter device 2 or a user device 3) is able to move freely along the horizontal line. FIG. 5 depicts the main interface when the participant using the application, which is denoted by the circle 2B, moves closer to the other participant. The result is both that there is a visual representation of this movement through the virtual space vis-a-vis the circle 2B and the circle 2A being rendered closer, and that the video media stream from the participant represented by the circle 2A is rendered as a more prominent feature of the interface. Correspondingly, it must be noted as there is no indication from the figure, that the audio stream from the other participant is raised in volume.

FIG. 6 depicts the interface when the participant using the application, which is denoted by the circle 2B, moves yet closer to the other participant. The result is both that there is a visual representation of this movement through the virtual space vis-a-vis the circle 2B and the circle 2A being rendered even closer (to the point of overlapping), and that the video media stream from the participant represented by the circle 2A is rendered as the dominant feature of the interface. Correspondingly, it must be noted as there is no indication from the figure, that the audio stream from the other participant is raised in volume.

As in FIGS. 2-5, the icons 2A and 2B may be shown in various colors, to denote individual participants. Notably, the video 3 shown in these figures may be outlined by the corresponding color for the individual participant. In addition, the video 3 may be shown in a circle, or any other shape.

Notably the invention is able to use peer-to-peer communication techniques to instigate either the establishment or disestablishment of media streams. Because users do not need access to all participant media streams at all times, as is the case with traditional video conferencing, the invention enables the use of peer-to-peer communication without dedicated media routing in large social groups. In this case large could be considered groups of size greater than 5. In this way, the invention provides the ability to extend peer-to-peer architectures to larger groups than it would typically be used for by selectively filtering media streams based on user's positions in the virtual space.

Figure 2:
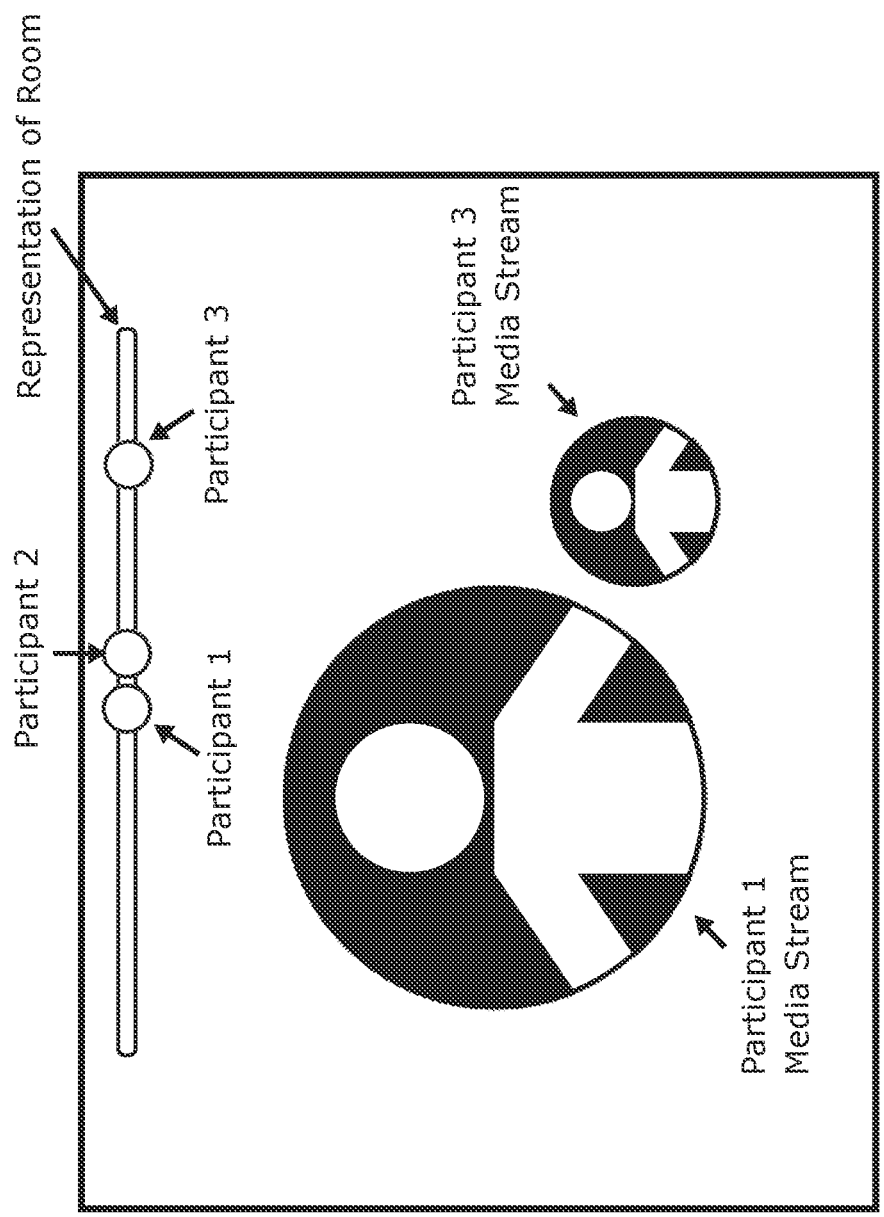
FIG. 2 demonstrates three participants using the application in a one-dimensional virtual space.
Figure 3:
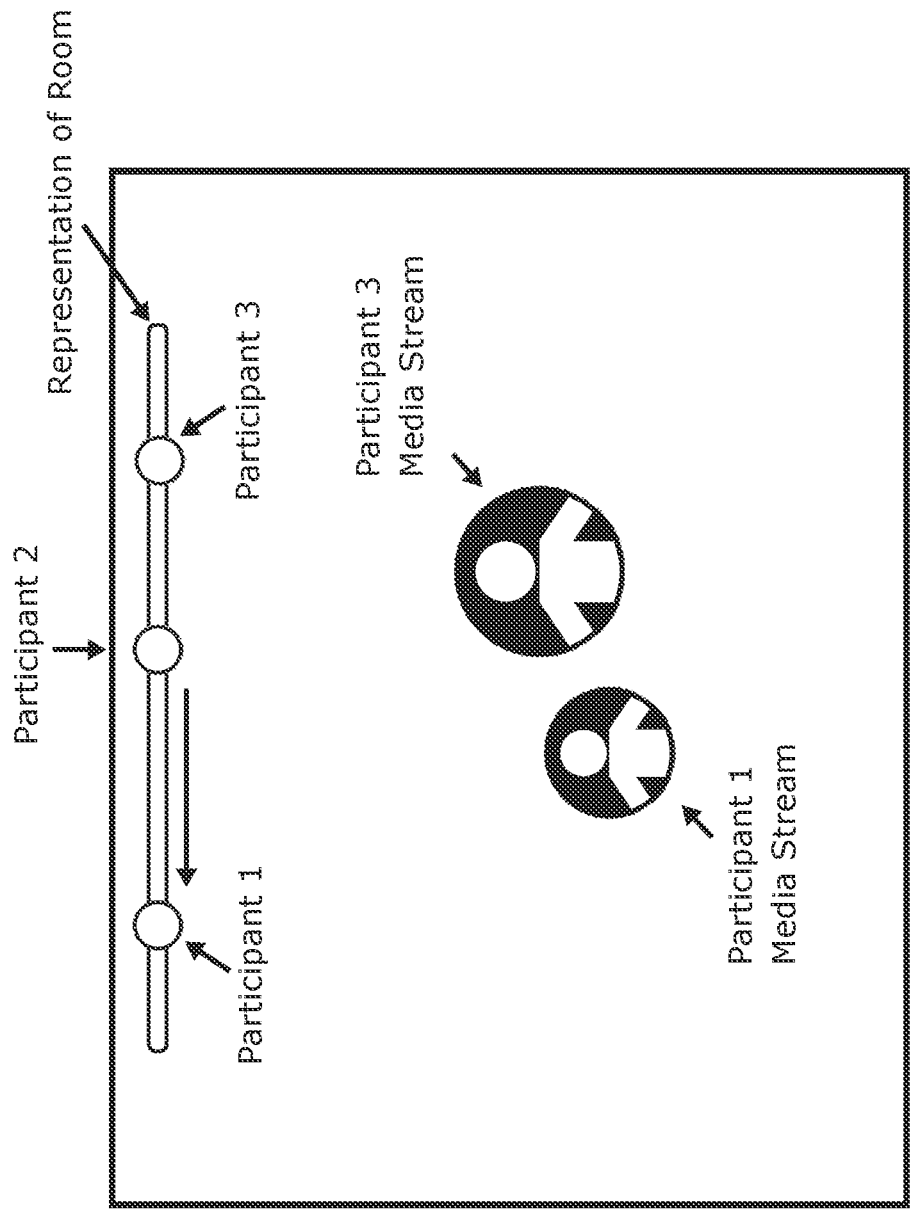
FIG. 3 depicts the effect of one participant's movement on an observer's view of that participant's media stream while another participant maintains the same distance to the observer.

The above described user experience implements both peer-to-peer connections using WebRTC, web sockets, and client-server connections. The media streams for both audio and video data are modified and/or filtered and/or severed using modern web and server technologies to accomplish the effect described above and depicted by the figures. The effect of various participants' video streams rendering in dynamically sized portions of the interface based on their proximity on the horizontal line 1 is done using a physics inspired approximation of a circle packing algorithm. An example placement of multiple incoming streams is depicted in FIG. 2 and FIG. 3. In tandem these techniques enable the invention to circumvent limitations of scale for audio and/or video communication using exclusively peer-to-peer connections. This is done by establishing real time connections for sending media streams between users in close proximity and destroying those connections for users outside the proximal range. This enables just-in-time connections for media delivery.

Although the invention has been illustrated and described herein with reference to a preferred embodiment and a specific example thereof, it will be readily apparent to those of ordinary skill that the art that other embodiments and examples may perform similar functions and/or achieve user experiences. All such equivalent embodiments and examples are within the spirit and scope of the present invention, are contemplated thereby, and are intended to be covered by the following claims.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect. The present disclosure is to be considered as an example of the invention, and is not intended to limit the invention to a specific embodiment illustrated by the figures above or description below.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components. As used herein, the term "and/or" includes any and all combinations of one or more of the associated listed items. As used herein, the term "application" is intended to be interchangeable with the term "invention", unless context clearly indicates otherwise. As used herein, the term "virtual space" is intended to mean the set of possible user locations, where a location is specified by parameters assigned to each user. These parameters are modifiable by the user, thereby rendering the space navigable.

To aid the Patent Office and any readers of any patent issued on this application in interpreting the claims appended hereto, Applicant that it does not intend any of the claims or claim elements to invoke 35 U.S.C. 112(f) unless the words "means for" or "step for" are explicitly used in the particular claim.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings. In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. Furthermore, the specification and claims should be read with the understanding that the virtual space, or spaces, and/or the number of participants using the invention simultaneously which are implied or described herein do not limit the scope of the invention or the claims.

What is claimed is:

1. A system for controlling the communication of audiovisual conference data, comprising:
 a computer;
 a user device in data communication with said computer;
 an audiovisual data source;
 a virtual distance assigned to the audiovisual data source and associated with the user device;
 video data from said audiovisual data source received by said user device;

the user device displaying the video data at a first size;
the virtual distance being modifiable based on a user command,
wherein when the virtual distance is changed, the size at which the video data is displayed changes.

2. The system of claim 1 wherein when the virtual distance is below a value, the video data is displayed at the first size and when the virtual distance at or above the value the video data is displayed at a second size.

3. The system of claim 2 wherein the second size of the video data is such that the video data is not displayed.

4. The system of claim 1, further comprising:
audio data from said audiovisual data source received by said user device;
the user device playing the audio data at a first volume;
wherein when the virtual distance is changed, the volume at which the audio data is played changes.

5. The system of claim 4, further comprising speakers on the user device for playing the audio data and a display for displaying the video data.

6. The system of claim 5, the display showing a user device icon and a audiovisual data source icon with an indication of the virtual distance.

7. The system of claim 6, the user device having an input device for inputting the user command to modify the virtual distance, the modified virtual distance is sent to the audiovisual data source.

8. The system of claim 7, wherein the audiovisual data source is a presenter device including a video camera and a microphone.

9. The system of claim 8, further comprising:
user device video data sent to the presenter device;
the user device video data being displayed at a first size on the presenter device based on the virtual distance, and at a second size based on the modified virtual distance.

10. The system of claim 8, further comprising:
user device audio data sent to the presenter device;
the user device audio data being played at a first volume on the presenter device based on the virtual distance, and at a second volume based on the modified virtual distance.

11. The system of claim 10, further comprising:
user device audio data sent to the presenter device;
the user device audio data being played at a first volume on the presenter device based on the virtual distance, and at a second volume based on the modified virtual distance.

12. The system of claim 11, wherein the user device has a video camera and a microphone.

13. The system of claim 12, the user device and the at least one presenter device having a peer-to-peer connection.

14. The system of claim 12, wherein the size of the video displayed on the user device and the size of the video displayed on the user device are proportionately equal.

15. The system of claim 12, wherein the volume of the audio played on the user device and the volume of the audio played on the user device are proportionately equal.

16. The system of claim 12, further comprising:
multiple presenter devices, each:
having a virtual distance associated with the user device;
providing video data received by said user device; and
providing audio data received by said user device.

17. The system of claim 15, further comprising virtual distances assigned to each pair of the multiple presenter devices.

18. The system of claim 1, wherein the virtual distance is modifiable without moving the user device.

19. A system for controlling the communication of audiovisual conference data, comprising:
a computer;
a user device in data communication with said computer;
an audiovisual data source;
a virtual distance assigned to the audiovisual data source and associated with the user device;
audio data from said audiovisual data source received by said user device;
the user device playing the audio data at a first volume;
the virtual distance being modifiable based on a user input,
wherein when the virtual distance is changed, the volume at which the audio data is played changes.

20. A system for controlling the communication of audiovisual conference data, comprising:
a computer;
a user device in data communication with said computer;
an audiovisual data source;
a virtual distance assigned to the audiovisual data source and associated with the user device;
audio data from said audiovisual data source received by said user device;
the user device playing the audio data at a first volume;
the virtual distance being modifiable based on a user input;
wherein when the virtual distance is changed, the volume at which the audio data is played changes;
video data from said audiovisual data source received by said user device;
wherein when the virtual distance is above a value, the video data is no longer displayed and when the virtual distance at or below the value the video data is displayed.

* * * * *